United States Patent
Aissi et al.

(10) Patent No.: US 10,250,593 B2
(45) Date of Patent: *Apr. 2, 2019

(54) IMAGE BASED KEY DEPRIVATION FUNCTION

(71) Applicant: Visa International Service Association, San Francisco, CA (US)

(72) Inventors: Selim Aissi, Dublin, CA (US); Taeho Kgil, Foster City, CA (US); Ajit Gaddam, Sunnyvale, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/677,377

(22) Filed: Aug. 15, 2017

(65) Prior Publication Data

US 2017/0346806 A1 Nov. 30, 2017

Related U.S. Application Data

(63) Continuation of application No. 15/359,554, filed on Nov. 22, 2016, now Pat. No. 9,769,156, which is a
(Continued)

(51) Int. Cl.
*H04L 9/00* (2006.01)
*H04L 29/06* (2006.01)
(Continued)

(52) U.S. Cl.
CPC ............ *H04L 63/083* (2013.01); *G06F 21/36* (2013.01); *G09C 5/00* (2013.01); *H04L 9/0861* (2013.01);
(Continued)

(58) Field of Classification Search
CPC ................................................ G06F 2221/2107
(Continued)

(56) References Cited

U.S. PATENT DOCUMENTS 6,367,010 B1 4/2002 Venkatram et al.
6,985,593 B2 * 1/2006 Nichols ............... B60R 11/0217
181/145
(Continued)

FOREIGN PATENT DOCUMENTS

CN 101455026 A 6/2009
CN 101965723 A 2/2011
(Continued)

OTHER PUBLICATIONS

U.S. Appl. No. 14/304,488, "Non-Final Office Action", dated Sep. 11, 2015, 7 pages.
(Continued)

*Primary Examiner* — Christopher J Brown
(74) *Attorney, Agent, or Firm* — Kilpatrick Townsend & Stockton LLP

(57) ABSTRACT

Embodiments of the invention relate to methods of generating and using an image-based derived key. In various embodiments, the image-based derived key may be used to facilitate user authentication and data encryption. For some embodiments, a method is disclosed comprising determining an image-based derived key, wherein the image-based derived key is generated from a selection of authentication images chosen by a user, encrypting data using the image-based derived key, and transmitting the encrypted data.

20 Claims, 13 Drawing Sheets

Related U.S. Application Data continuation of application No. 14/304,488, filed on Jun. 13, 2014, now Pat. No. 9,537,847.

(60) Provisional application No. 61/834,765, filed on Jun. 13, 2013.

(51) Int. Cl.
*G06F 21/36* (2013.01)
*G09C 5/00* (2006.01)
*H04L 9/08* (2006.01)

(52) U.S. Cl.
CPC ...... *H04L 63/08* (2013.01); *G06F 2221/2107* (2013.01); *H04L 63/0428* (2013.01); *H04L 63/06* (2013.01); *H04L 2463/061* (2013.01); *H04L 2463/062* (2013.01)

(58) Field of Classification Search
USPC .......................................... 726/28; 713/184
See application file for complete search history.

(56) References Cited

U.S. PATENT DOCUMENTS

| 8,392,975 | B1 | 3/2013 | Raghunath |
| 8,788,836 | B1* | 7/2014 | Hernacki ............... G06F 21/31 713/155 |
| 2004/0230843 | A1* | 11/2004 | Jansen ................ G06F 21/36 726/7 |
| 2008/0175377 | A1 | 7/2008 | Merrill |
| 2008/0244700 | A1 | 10/2008 | Osborn et al. |
| 2008/0263361 | A1 | 10/2008 | Dutta et al. |
| 2010/0169958 | A1 | 7/2010 | Werner et al. |
| 2010/0287382 | A1 | 11/2010 | Gyorffy et al. |
| 2012/0185698 | A1 | 7/2012 | Fiske |
| 2012/0288089 | A1 | 11/2012 | Sauerwald et al. |
| 2013/0138968 | A1 | 5/2013 | Yudkin et al. |
| 2013/0139238 | A1 | 5/2013 | Ryan |
| 2013/0232549 | A1* | 9/2013 | Hawkes ............... G06F 21/36 726/3 |

FOREIGN PATENT DOCUMENTS

| CN | 103095553 A | 5/2013 |
| GB | 2478924 A | 9/2011 |
| KR | 1020130021126 A | 3/2013 |
| RU | 2483476 A | 5/2013 |
| WO | 2012059756 A1 | 5/2012 |

OTHER PUBLICATIONS

U.S. Appl. No. 14/304,488 , "Final Office Action", dated Dec. 30, 2015, 9 pages.
U.S. Appl. No. 14/304,488 , "Non-Final Office Action", dated Apr. 21, 2016, 10 pages.
U.S. Appl. No. 14/304,488 , "Notice of Allowance", dated Aug. 26, 2016, 7 pages.
EP14839090.9 , "Extended European Search Report", dated Mar. 11, 2016, 10 pages.
Menezes et al., "Handbook of Applied Cryptography", Chapter 1: Overview of Cryptography, CRC Press Series on Discrete Mathematices and Its Applications Available online at: http://cacr.uwaterloo.ca/hac/about/chap1.pdf, Oct. 1, 1996, pp. 1-48.
PCT/US2014/042386 , International Search Report and Written Opinion, dated Feb. 27, 2015, 14 pages.
Search Report , completed May 11, 2018, in Russian Application No. 2016100178, 2 pages.
First Office Action, dated Jun. 4, 2018, in Chinese Patent Application No. 201480042884.5, Search Report, 8 pages.

* cited by examiner

US 10,250,593 B2

IMAGE BASED KEY DEPRIVATION FUNCTION

CROSS-REFERENCES TO RELATED APPLICATIONS

The present application is a continuation of U.S. Non-Provisional application Ser. No. 15/359,554, filed on Nov. 22, 2016, which is a continuation of U.S. Non-Provisional application Ser. No. 14/304,488, filed on Jun. 13, 2014, now U.S. Pat. No. 9,537,847, which claims priority to U.S. Provisional Application No. 61/834,765, filed on Jun. 13, 2013, the entire contents of which are herein incorporated by reference for all purposes.

BACKGROUND OF THE INVENTION

A longstanding goal in computer security is to enable highly secure transmission of data. Passwords are a commonly used technique for user authentication whereby a user may enter a sequence of alphabetic, numeric, or other characters. The password may be directly compared with a password at a server computer, or hashed and compared with a hash stored at the server computer. Once the password is verified, an encryption key may be established between the user and the server computer. However, typical passwords chosen by users are often low-entropy: they have few characters and common patterns. Thus, brute force attacks such as general purpose graphical processing unit (GPGPU) based attacks may be used to crack passwords. In some cases, minimum password length and complexity requirements may be defined to force users to choose complex passwords. However, increasing a password's complexity increases a user's difficulty in remembering the password, which may lead to yet other sources of vulnerability (e.g., the user writing down the password on a notepad or saving it in an electronic document).

Embodiments of the present invention address these problems and other problems individually and collectively.

BRIEF SUMMARY OF THE INVENTION

Embodiments of the invention relate to methods of generating and using an image-based derived key. In various embodiments, the image-based derived key may be used to facilitate user authentication and data encryption.

One embodiment discloses a method comprising determining an image-based derived key, wherein the image-based derived key is generated from a selection of authentication images chosen by a user, encrypting data using the image-based derived key, and transmitting the encrypted data.

One embodiment of the invention discloses a server computer. The server computer comprises a processor and a non-transitory computer-readable storage medium, comprising code executable by the processor for implementing a method comprising determining an image-based derived key, wherein the image-based derived key is generated from a selection of authentication images chosen by a user, encrypting data using the image-based derived key, and transmitting the encrypted data.

DETAILED DESCRIPTION OF THE INVENTION

Figure 1:
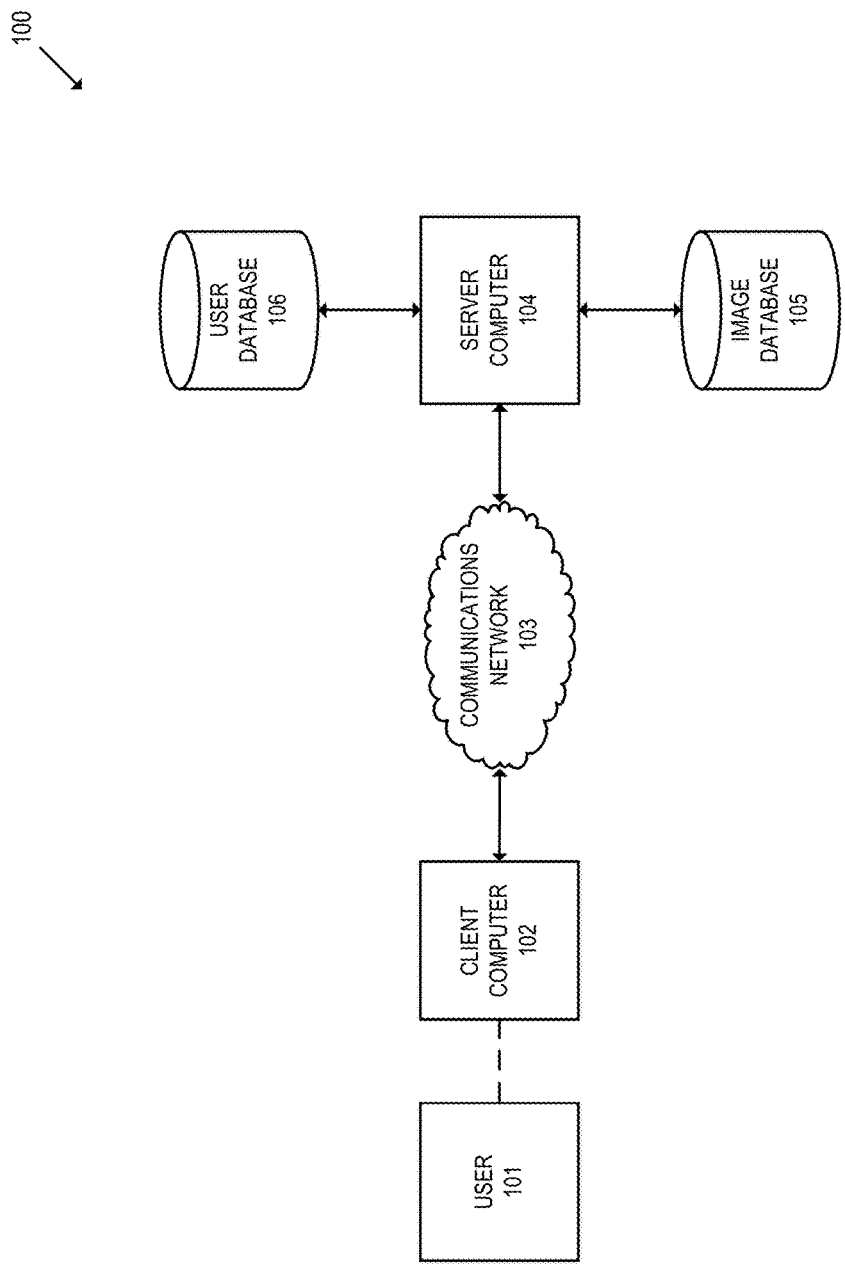
FIG. 1 shows a system that may be used with embodiments of the invention.

Embodiments of the invention relate to methods of generating and using an image-based derived key. In various embodiments, the image-based derived key may be used to facilitate user authentication and data encryption.

In some embodiments, a user may select a subset of images from a plurality of images presented to the user. The user's selection of authentication images may be used to generate an image-based derived key using an image-based key derivation function. The image-based derived key may be used by a client computer to encrypt data sent to a server, or decrypt data received from the server. In addition, the image-based derived key may be used by a server computer to encrypt data sent to the user, or decrypt data received from the user. Furthermore, an image-based derived key may be used to authenticate the user by comparing the key to a previous key stored for the user.

Prior to further description of embodiments of the invention, description of some terms may be helpful in understanding embodiments of the invention.

An "image" may include any electronic representation of visual data, such as a picture, icon, figure, or other representation. An image may be used to display, for example, a two-dimensional grid of pixels. An image may be stored in any suitable format, such as the JPEG, GIF, BMP, and PNG electronic file formats. An "authentication image" may include any image that may be used for user authentication. For example, a server computer may maintain a plurality of authentication images that may be selected by a user.

An "encryption key" may include any data element or other piece of information operable to encrypt data (e.g., plaintext) into ciphertext. A "decryption key" may include any data element or other piece of information operable to decrypt ciphertext into the original data (e.g., plaintext). In some embodiments, an encryption key and a decryption key may be the same key (e.g., in a symmetric key system). In such cases, an encryption key may be used to decrypt ciphertext. In other embodiments, the encryption and decryption keys may be different (e.g., in an asymmetric key system).

A "key derivation function" may include any function used to determine one or more encryption or decryption keys. Typically, a key derivation function may take as input an input value and use the input value to generate the key. In some cases, the key derivation function may also use a salt value, an iteration count, a load factor, and/or any other suitable parameter. Key derivation functions may be implemented in any suitable manner, such as using a cryptographic hash function. One example of a key derivation function is Password Based Key Derivation Function 2 (PBKDF2, as specified in RFC 2898).

An "image-based key derivation function" (IBKDF) may include any key derivation function wherein an input value is generated from a plurality of images. The images used as input may be determined in any suitable manner, such as by a subset selected by a user. Any suitable aspect of the images may be used as input. For example, in some cases, an image identifier or image metadata associated with the image may be used as an input to the IBKDF. In some cases, a hash or other function may be applied to an image, and the resulting value may be used as an input to the IBKDF. In some cases, the data comprising the image itself may be used as input to the IBKDF.

An "image-based derived key" may include any cryptographic key generated using an image-based key derivation function. The image based derived key may be of any suitable type (e.g., symmetric or asymmetric) and length.

Embodiments of the invention provide the advantage of establishing protected communications with a user in a manner that is more secure than password-based approaches. Regardless of the cryptographic strength of techniques used in authentication, encryption, and decryption, such techniques may ultimately rely on the user to provide information proving their identity. If the information provided by the user is too simple, it may be vulnerable to brute force attacks. In password-based approaches to user authentication, the user must select a password comprising alphabetic, numeric, or other characters and reproduce the password each time the user is to be authenticated. However, selecting and remembering a high-entropy password—one that contains a high amount of complexity such as varying capitalization and the use of symbols and other special characters—is often difficult for users. In contrast, an image, by nature of the medium, may contain considerably more entropy than a character. Since humans may more easily remember a short sequence of pictures than a long and highly complex sequence of characters, a user may more easily use a high-entropy subset of images for authentication than an alphanumeric password. Thus, embodiments of the invention enable the generation of high-entropy keys and their use for secure communication without being burdensome on users. This improves security and discourages brute-force or rainbow table-based attacks.

In addition, embodiments of the invention provide the advantage of establishing secure communications without requiring a separate authentication process. In one method of securely transmitting data, an authentication process may be first performed, and if authentication is successful, a session encryption key may be established between a user using a client computer and a server computer. Typically, such a process would involve (1) the client computer sending authentication information (e.g., a password) to the server computer, (2) the server computer verifying the password, (3) the client computer and the server computer establishing a session key, (4) the server sending data encrypted using the session key to the user, and (5) the user decrypting the encrypted data using the session key. Embodiments of the invention can improve on this process by collapsing both authentication and transmission of data into a single step by each of the server and user. Specifically, according to some embodiments, a server computer can send data to a client computer encrypted using an image-based derived key previously determined by the user. The client computer can then regenerate the image-based derived key using a subset of authentication images indicated by the user. The regenerated derived key can be used to decrypt the data. Thus, whereas a process of sequential authentication and data transmission may require several messages to be exchanged between a server computer and a client computer, embodiments allow data to be securely transmitted using a single message. This may be especially advantageous in situations where network access is unreliable or high-latency.

In addition, embodiments of the invention provide the advantage of enabling greater security on mobile devices and other devices with limited input capabilities. For instance, entering a long and complex password using a capacitive keyboard on a mobile phone may be time consuming and error-prone for a user. In contrast, embodiments of the invention allow for a user to select a subset of authentication images by selecting the images from a grid of images. Since each image has a higher entropy than a single character, images displayed to the user may be made larger, and thus easier to select with a finger, stylus, or other input device than the individual keys displayed on a capacitive keyboard. Thus, embodiments of the invention can improve user experience over password-based authentication.

The above examples highlight only a few of the advantages of using an image-based derived key in accordance with embodiments of the invention.

I. Systems

FIG. 1 shows a system 100 according to an embodiment of the invention. The system 100 comprises a user 101 that may interact with client computer 102. The client computer 102 may be connected to a server computer 104 using a communications network 103. Communications network 103 may be any suitable computer network, such as a wired or wireless network. Server computer 104 may be connected to user database 106, which may store various data related to user 101 and/or other users, and image database 105, which may store various data related to images such as image files, image metadata, and image identifiers.

Furthermore, although the terms "client computer" and "server computer" are being used in some embodiments to describe the flow of communications between two computing devices for ease of explanation, it should be appreciated that embodiments are not limited to client-server relationships. For example, in some embodiments, the techniques described herein can also be used to facilitate peer-to-peer communication between two or more computing devices. Thus, in some embodiments, client computer 102 and server computer 104 may have the same or similar capabilities and/or functionalities, and may be implemented with the same or similar components. Moreover, one computing device may act as a client computer in some instances, and may act as a server computer in other instances, depending on how the computing device is interacting with another computing device.

Figure 2:
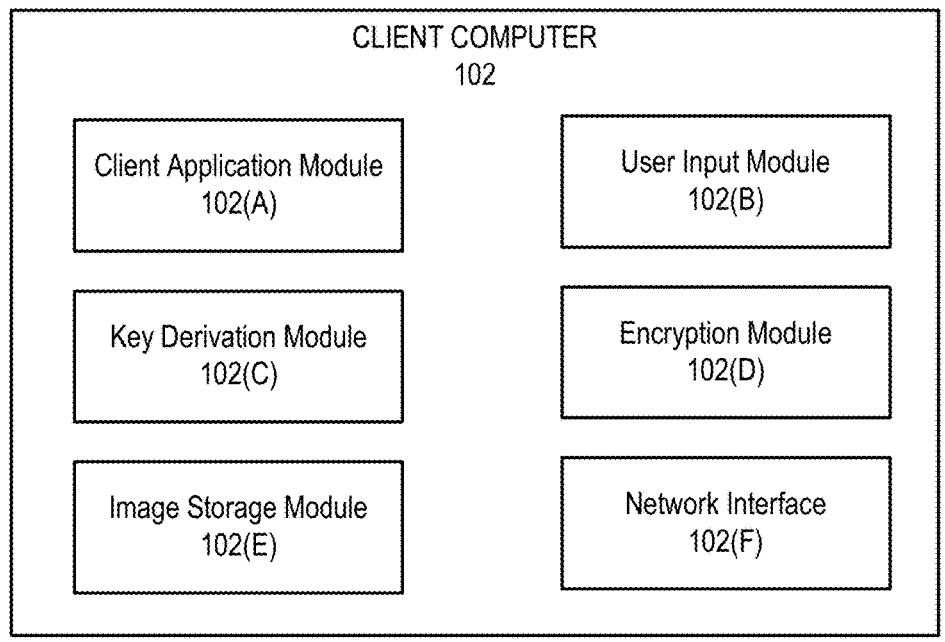
FIG. 2 shows an example of a client computer according to some embodiments.

FIG. 2 shows an example of a client computer 102 according to one embodiment of the invention. Client computer 102 may include any suitable computing device, such as a desktop or laptop computer, a tablet, and a smartphone or other mobile device. Client computer 102 may comprise a plurality of modules, such as client application module 102(A), user input module 102(B), key derivation module 102(C), encryption module 102(D), image storage module 102(E), and network interface 102(F). Each of modules 102(A)-(F) may be implemented using any combination of computer hardware and software such as processors and computer readable media.

Client application module 102(A) may be configured to run one or more client applications. A client application may include any app, software, or other executable. In some embodiments, a client application may be configured to receive a plurality of images from a server computer and display the plurality of authentication images to a user. The client application may determine a subset of authentication images selected by a user. The client application may also initiate the encryption or decryption of data using an image-based derived key generated from the selection of authentication images. The client application may interface with any one of modules 102(B)-(F).

User input module 102(B) may be configured to process user input from one or more user input devices such as keyboards, mice, touchscreens, etc. The user input may be used to determine, for example, which of a plurality of authentication images are selected by a user. For example, if the authentication images are displayed in a grid, user input module 102(B) may be used to determine one or more locations in the grid indicated by the user, and images corresponding to the indicated locations.

Key derivation module 102(C) may be configured to derive image-based derived keys using an image-based key derivation function (IBKDF). In some embodiments, the image-based key derivation function used by key derivation module may take as an input a plurality of images selected by a user. Any suitable aspect of the images may be used as input. For example, in some cases, an image identifier or image metadata associated with the image may be used as an input to the IBKDF. In some cases, a hash or other function may be applied to an image, and the resulting value may be used as an input to the IBKDF. In some cases, some or all of the image data (e.g., pixel properties of some or all of the pixels in the image) of the image itself may be used as input to the IBKDF. In some embodiments, the input to the IBKDF may include a combination of these. In some embodiments, key derivation module 102(C) may be implemented completely or partially in specialized hardware, such as using a hardware security module (HSM), trusted platform module (TPM), or secure element (SE).

Encryption module 102(D) may be configured to encrypt and decrypt data using cryptographic keys. In various embodiments, encryption module 102(D) may be configured to encrypt and decrypt data using symmetric keys (e.g., AES, TDES, Blowfish, etc.), or asymmetric keys (e.g., RSA and ECC) of any suitable length. In some embodiments, encryption module 102(D) may be implemented completely or partially in specialized hardware, such as using a hardware security module (HSM), trusted platform module (TPM), or secure element (SE). Typically, encryption module 102(D) will use an image-based derived key to encrypt data to be sent to a server computer 104, or decrypt data received from server computer 104.

Image storage module 102(E) may be configured to store a plurality of images. In some embodiments, the plurality of images may include a subset of authentication images selected by a user, and also a plurality of other authentication images. In various embodiments, image storage module 102(E) may receive images over a network (e.g., from a server computer), from another storage medium (e.g., a portable storage medium), or directly from a camera (e.g., a camera connected to or part of client computer 102).

Network interface 102(F) may include any software and/or hardware configured to communicate with a computer network. Network interface 102(F) may include any suitable wired or wireless interface such as Ethernet, WiFi, Bluetooth, NFC, etc. Network interface 102(F) may be used to connect client computer 102 to any local area network (LAN) or wide area network (WAN).

Figure 3:
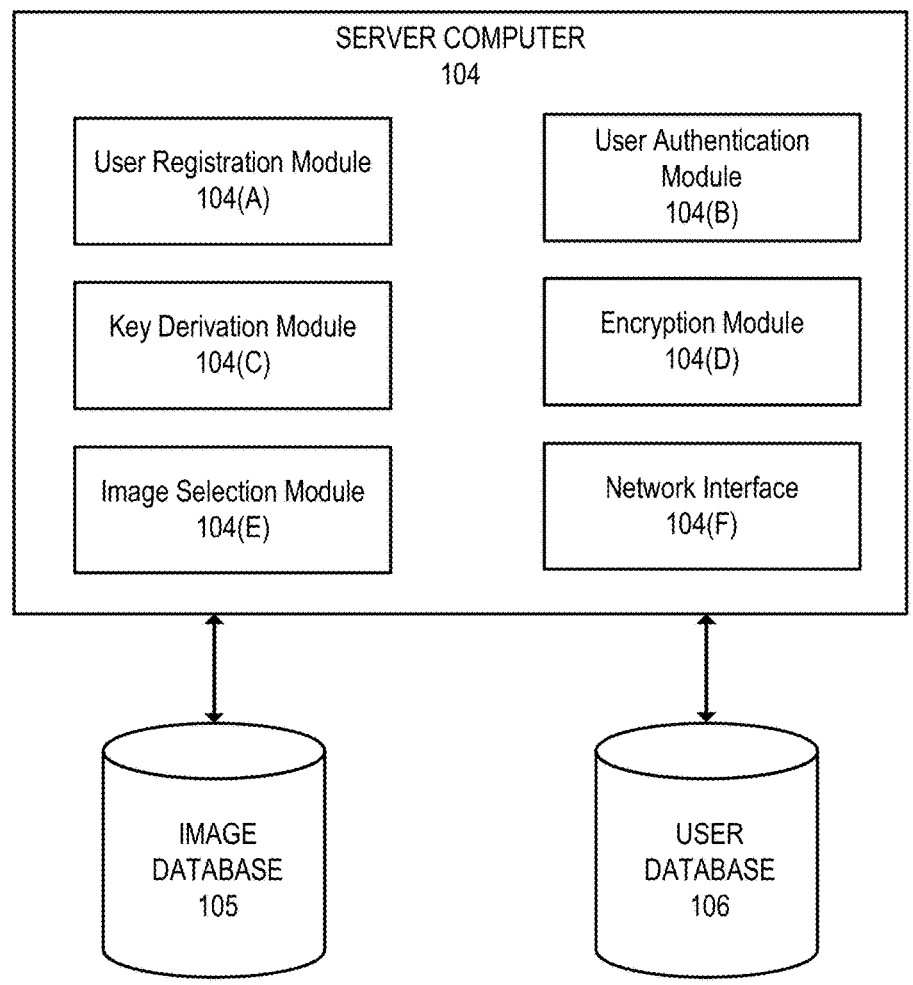
FIG. 3 shows an example of a server computer according to some embodiments.

FIG. 3 shows an example of a server computer 104 according to one embodiment of the invention. A server computer is typically a powerful computer or cluster of computers. For example, the server computer can be a large mainframe, a minicomputer cluster, or a group of servers functioning as a unit. In one example, the server computer may be a database server coupled to a Web server. The server computer 104 may comprise a plurality of modules, such as user registration module 104(A), user authentication module 104(B), key derivation module 104(C), encryption module 104(D), image selection module 104(E), and network interface 104(F). Each of modules 104(A)-(F) may be implemented using any combination of computer hardware and software such as processors and computer readable media. In addition, server computer 104 may be coupled to image database 105 and/or user database 106.

User registration module 104(A) may be configured to register users with the server computer 104. Registering a user may comprise, for example, sending to a client computer a plurality of authentication images, receiving from the client computer a subset of the authentication images selected by user 101, and storing the subset of selected images in a database entry associated with user 101 (e.g., in user database 106). User registration module 104(A) may also be configured to receive other information relating to user 101, such as personal information, payment information, or any other suitable information.

User authentication module 104(B) may be configured to authenticate users. Typically, user authentication module 104(B) may authenticate users previously registered with server computer 104. Authenticating a user may comprise, for example, receiving a subset of a plurality of authentication images selected by user 101, generating an image-based derived key using the subset of authentication images and an image-based key derivation function, and comparing the image-based derived key to a key previously stored for user 101 (e.g., in user database 106).

Key derivation module 104(C) may be configured to derive image-based derived keys using an image-based key derivation function (IBKDF). In some embodiments, the image-based key derivation function used by key derivation module may take as input a plurality of images selected by a user. Any suitable aspect of the images may be used as input. For example, in some cases, an image identifier or image metadata associated with the image may be used as an input to the IBKDF. In some cases, a hash or other function may be applied to an image, and the resulting value may be used as an input to the IBKDF. In some cases, some or all of the image data (e.g., pixel properties of some or all of the pixels in the image) of the image itself may be used as input to the IBKDF. In some embodiments, the input to the IBKDF may be include a combination of these. In some embodiments, key derivation module 104(C) may be implemented completely or partially in specialized hardware, such as using a hardware security module (HSM), trusted platform module (TPM), or secure element (SE).

Encryption module 104(D) may be configured to encrypt and decrypt data using cryptographic keys. In various embodiments, encryption module 104(D) may be configured to encrypt and decrypt data using symmetric keys (e.g., AES, TDES, Blowfish, etc.), or asymmetric keys (e.g., RSA and ECC) of any suitable length. In some embodiments, encryption module 104(D) may be implemented completely or partially in specialized hardware, such as using a hardware security module (HSM), trusted platform module (TPM), or secure element (SE). Typically, encryption module 104(D) will use an image-based derived key to either encrypt data to be sent to client computer 102, or decrypt data received from client computer 102.

Image selection module 104(D) may be configured to determine images to be sent to a client computer 102 in a registration, authentication, or encryption process. Images may be selected in any suitable manner. For example, in some embodiments, images may be randomly selected in some embodiments, the selected images may conform to a theme or category selected by a user. For example, if user 101 selected a category of images corresponding to "bodies of water," image selection module 104(D) may only retrieve images including lakes, oceans, rivers, or other bodies of water. In some embodiments, for encryption or authentication methods, the plurality of images comprising the user's selection of authentication images may be selected, and a random subset of other images may also be selected.

Network interface 104(F) may include any software and/or hardware configured to communicate with a computer network. Network interface 104(F) may include any suitable wired or wireless interface such as Ethernet, WiFi, Bluetooth, NFC, etc. Network interface 104(F) may be used to connect client computer 102 to any local area network (LAN) or wide area network (WAN).

Image database 105 may store a plurality of images. The images may be publicly available images (e.g., stock photos), or private images (e.g., images taken from a user's personal repository). In some embodiments, image database 105 may store the image data (e.g., image files) of the images themselves. In other embodiments, image database 105 may store metadata relating to the images, such an image identifier, a hash of the image, etc., without storing the actual images.

User database 106 may store information regarding a plurality of users. User database 106 may comprise, for example, a user identifier for each of the users, the image-based derived key for the users, and a hash or other protected indicator of the user's chosen subset of authentication images. In some embodiments, if the user has chosen a theme or category for authentication images, the theme or category may also be stored in user database 106.

II. Registration Methods

Figure 4:
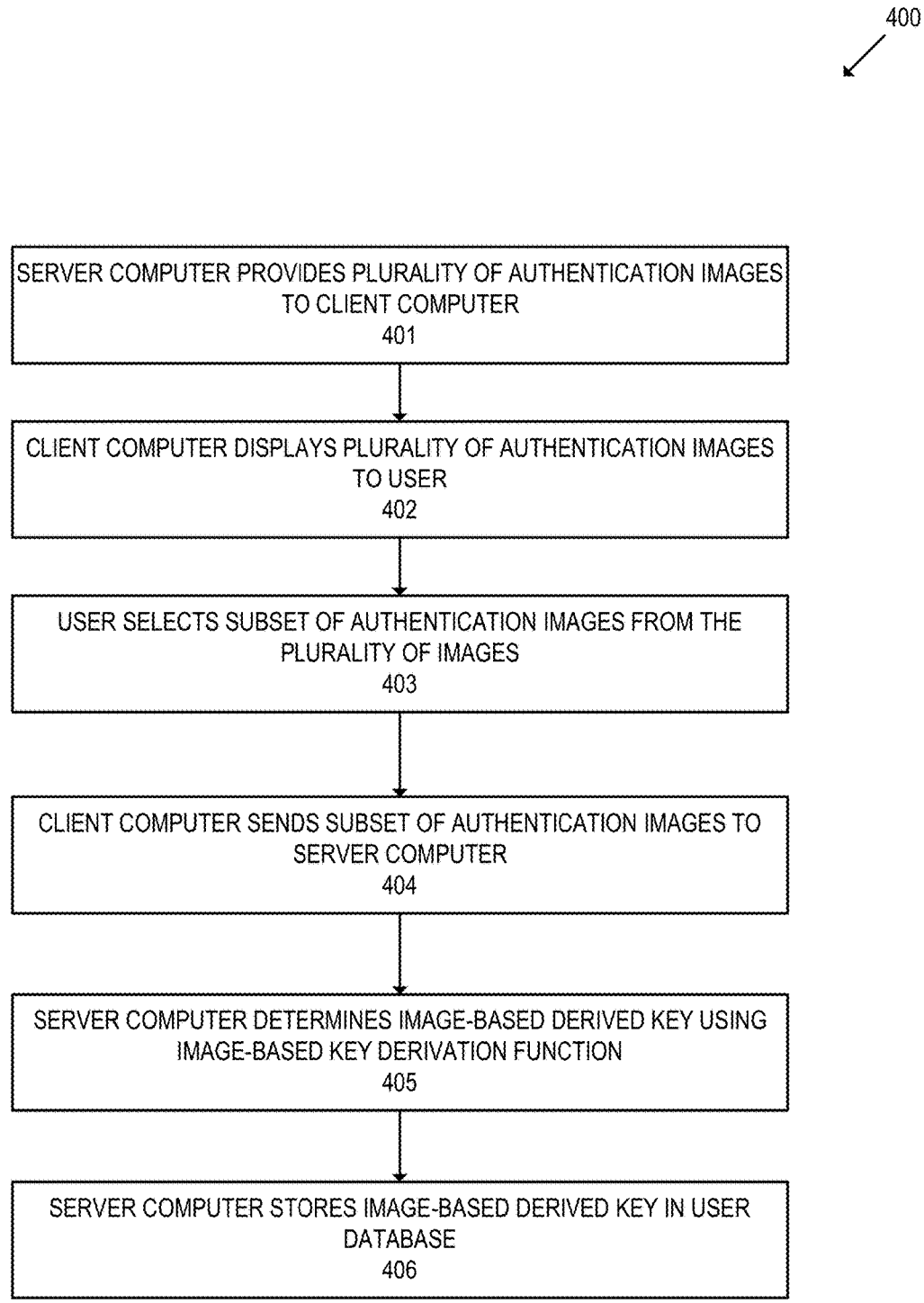
FIG. 4 shows a method for registering an image-based derived key associated with a user according to some embodiments.

FIG. 4 shows a method 400 for registering an image-based derived key associated with a user 101. Typically, method 400 may be performed before secure communication between client computer 102 and server computer 104 as described in methods 800 and 900, and before an authentication method such as method 1000. For example, in one embodiment, method 400 may be performed when a user is creating an account at server computer 104.

At step 401, server computer 104 provides a plurality of authentication images to client computer 102. The plurality of authentication images may be selected by server computer 104 using image selection module 105(E), and may comprise any suitable set of images (e.g., a set of images stored in image database 105). In some embodiments, user 101 may select a category or theme for the set of images, such as bodies of water, United States presidents, etc. In other embodiments, the images may be randomly selected from all images maintained by server computer 104.

At step 402, client computer 1022 displays the plurality of authentication images to user 101. The plurality of images may be displayed in any suitable format. In some embodiments, client computer 102 may display authentication images in a grid, so that each cell in the grid is a different image. In other embodiments, client computer 102 may display one of the plurality of images at a time, but allow a user to cycle through the plurality of images (e.g., using a button). In yet other embodiments, client computer 102 may conduct a slide show of the plurality of images.

Figure 6:
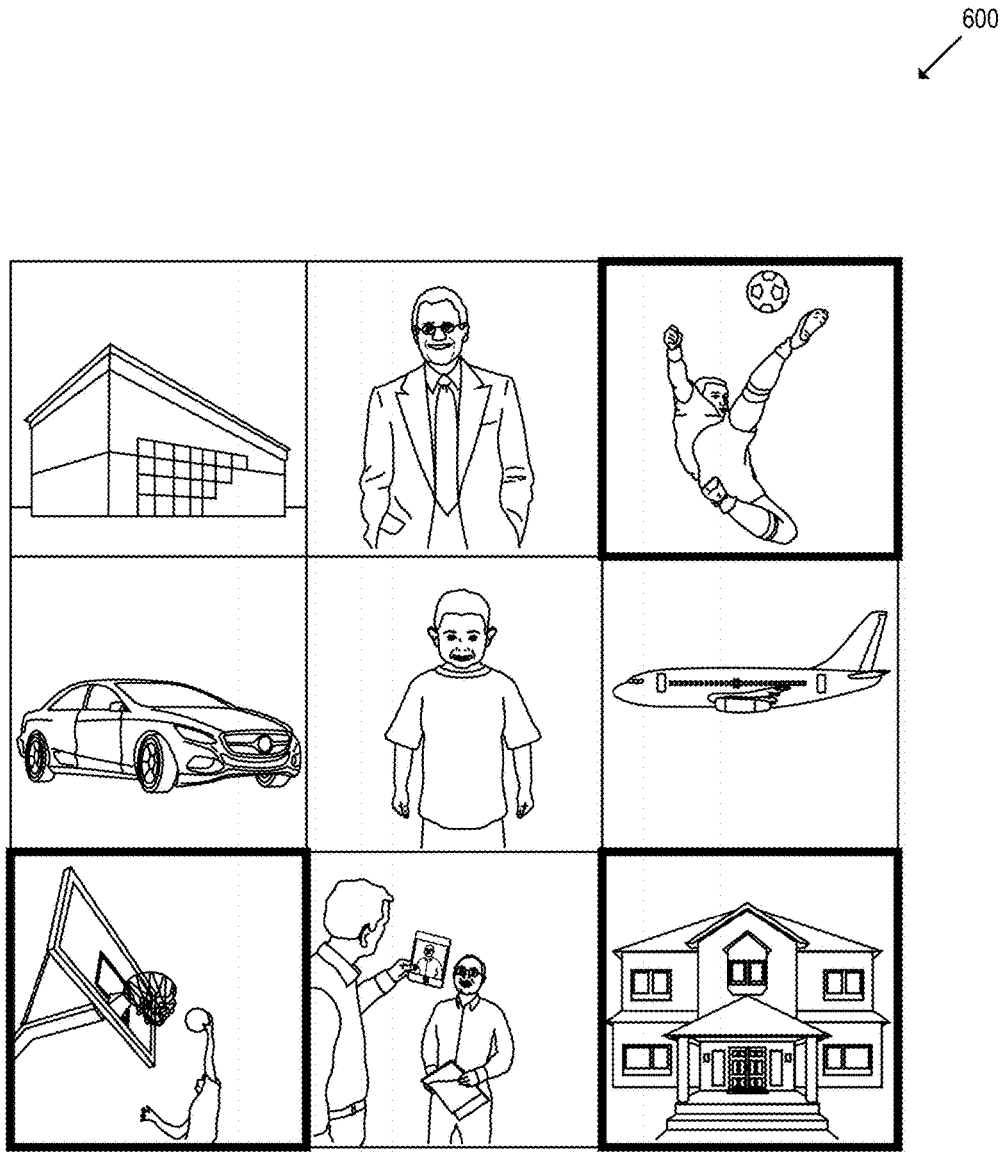
FIG. 6 shows an example of a grid illustrating nine images that may be received from a server computer and displayed by a client computer according to some embodiments.

FIG. 6 shows an example of a grid 600 illustrating nine images that may be received from server computer 104 and displayed by client computer 102. As shown in FIG. 6, the grid 600 may include images of a building, a man in a suit, a soccer player, a car, a child, an airplane, a basketball player, a man taking a picture of another man, and a house. Although the images shown in grid 600 are wire drawings, embodiments of the invention may utilize color images (e.g., photographs), grayscale images, animations, or any other suitable visual representations.

At step 403, user 101 selects a subset of authentication images from the plurality of images. The subset of images selected by user 101 may include a single image, or may include multiple images. In addition, the subset may be unordered (i.e., so that the order in which the images are chosen is unimportant), or ordered (i.e., so that both the images and the order in which they are chosen are captured). User 101 may select the subset of authentication images in any suitable manner. For example, if user 101 is using a mobile device with a capacitive touchscreen, user 101 may tap the images to be selected. If user 101 is using a desktop or laptop computer with a keyboard and mouse, user 101 may click on the images to be selected. One or more elements in client computer 102, such as client application module 102(A) and/or user input module 102(B) may capture the selection of user 101.

Grid 600 shows three images selected by user 101: the soccer player, the basketball player, and the house, as indicated, for example, by the highlighted border of the image.

At step 404, client computer 102 sends the subset of authentication images selected by user 101 to server computer 104. In some embodiments, the selected images themselves may be sent to server computer 104. For example, client computer 102 may send to server computer 104 a plurality of image files (e.g., JPG, PNG, or BMP files).

In other embodiments, row and column coordinates of the selected images in the image grid may be sent to server computer 104. For example, for the selection shown in grid 600, corresponding coordinates may be [(1, 3), (3, 1), (3, 3)]. The coordinate (1, 3) indicates the first row and the third column, indicating the picture of the soccer player. The coordinate (3, 1) indicates the third row and the first column, indicating the picture of the basketball player. The coordinates (3, 3) indicate the third row and the third column, indicating the picture of the house. Thus, the coordinate list [(1, 3), (3, 1), (3, 3)] may be used to indicate the selected subset of authenticated images sent to server computer 104.

In other embodiments, unique identifiers corresponding to each selected image may be transmitted. In one example, server computer 104 may maintain a database of 1000 images, numbered from 0-999. For example, the soccer player image may be numbered 523, the basketball player image may be numbered 135, and the house image may be numbered 878. Thus, the combination of the unique identifiers 523135878 may be transmitted to server computer 104 to indicate the secret image selection.

In yet other embodiments, hash values of the selected images may be sent to server computer 104. The hash values may be computed by, for example, running a hash function on the image.

Figure 7:
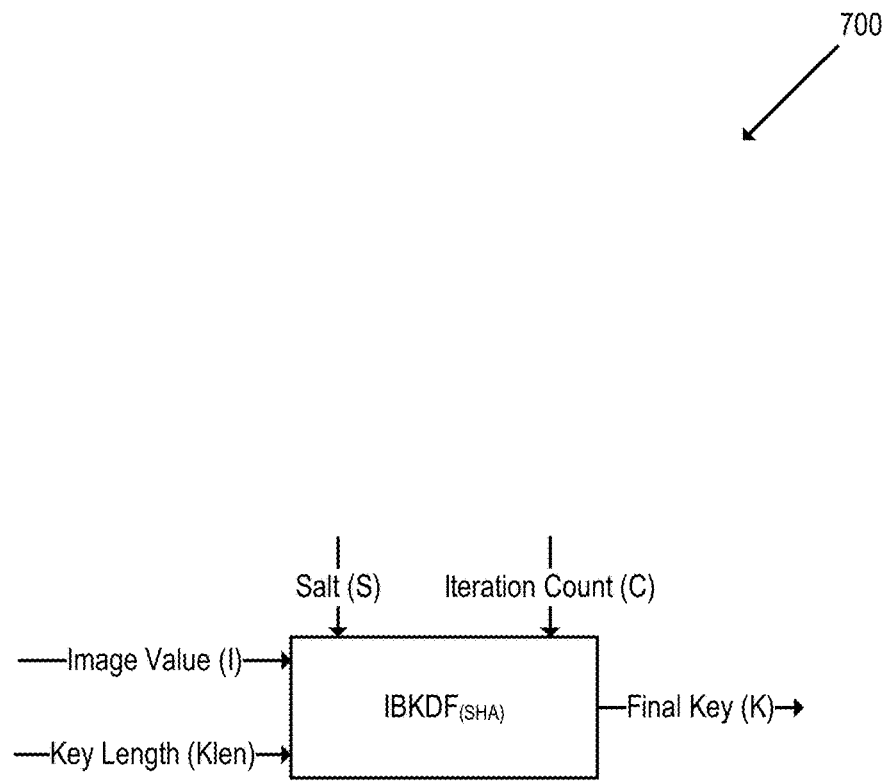
FIG. 7 shows a block diagram of an image-based key derivation function (IBKDF) according to some embodiments.

At step 405, server computer 104 determines an image-based derived key from the images selected by user 101 and an image-based key derivation function. An "image-based key derivation function" (IBKDF) may include any key derivation function wherein an input value is generated from a plurality of images. Any suitable aspect of the images may be used as input. For example, in some cases, an image identifier or image metadata associated with the image may be used as an input to the IBKDF. In some cases, a hash or other function may be applied to an image, and the resulting value may be used as an input to the IBKDF. In some cases, the some or all of the image data (e.g., pixel properties of some or all of the pixels in the image) of the image itself may be used as input to the IBKDF. In some embodiments, the input to the IBKDF may be include a combination of these. The IBKDF may also take as input a number of other parameters, such as a salt value (e.g., a number or string), an iteration count or load factor, and a desired key length. One example of an IBKDF which may be used in some embodiments of the invention is shown in FIG. 7.

At step 406, server computer 104 stores the image-based derived key in user database 106. Typically, the image-based derived key is associated with an entry in user database 106 corresponding to user 101. In addition, in some embodiments, hashes and/or image identifiers corresponding to the selected authentication images may also be stored in user database 106.

Figure 5:
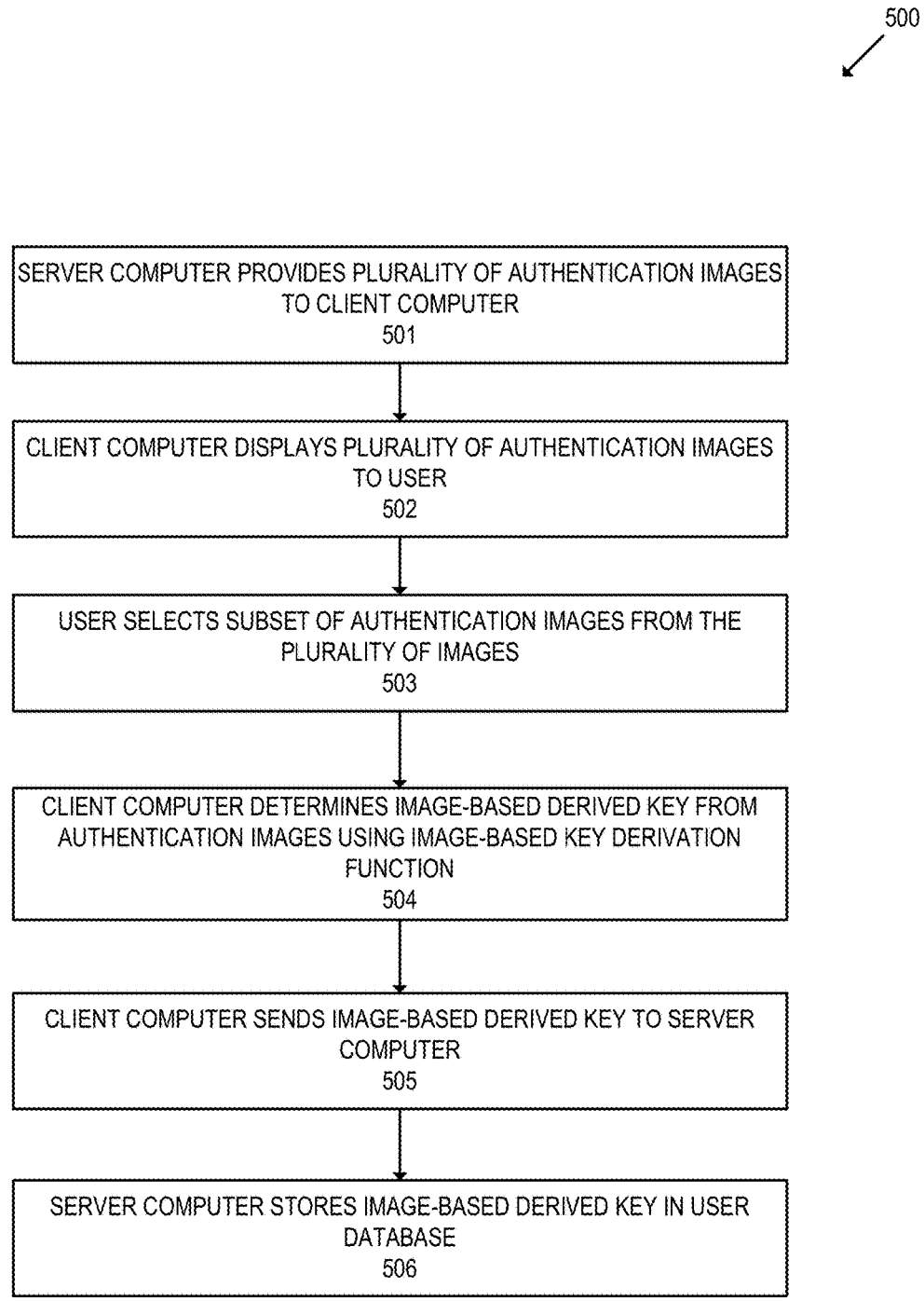
FIG. 5 shows an alternative registration method that may be used with some embodiments of the invention.

It should be noted that although method 400 describes one possible registration method, embodiments of the invention are not limited to the recited method. For instance, FIG. 5 shows an alternative registration method 500 that may be used with some embodiments of the invention. Steps 501-503 of method 500 are similar to steps 401-403 of method 400, respectively. However, whereas at step 404 of method 400 client computer 102 sends the subset of selected authentication images to server computer 104, at step 504 of method 500, client computer 102 determines an image-based derived key from the selected authentication images using an image-based key derivation function. At step 505, client computer 104 then sends the image-based derived key to server computer 104, and at step 506 server computer stores the image-based derived key in user database 506. Thus, in method 500, client computer 102, rather than the server computer 104, derives the image-based derived key.

In addition, although methods 400 and 500 include steps 401 and 501, respectively, reciting server computer 104 providing a plurality of images to client computer 102, in some embodiments, such steps need not be performed. For example, in some embodiments, the images selected by client computer 102 may be previously stored by client computer 102 (e.g., in image storage module 102(E)). For instance, user 101 may select images previously taken by a camera attached to client computer 102. In such cases, the images need not be maintained by server computer 104 in image database 105.

III. Key Derivation Methods

FIG. 7 shows a block diagram 700 of an image-based key derivation function (IBKDF) in accordance with one embodiment of the invention. As shown in FIG. 7, the IBKDF includes a number of parameters, such as an image value (I), a key length (Klen), a salt value (S), and an iteration count (C). The result of the IBKDF is a final key (K).

The image value (I) may represent a numeric value associated with the selection of authentication images. In some embodiments, the image value may be generated by combining identifiers for each selected image. For the selection shown in grid 600, in one embodiment, the soccer player image may be numbered 523, the basketball player may be numbered 135, and the house may be numbered 878. Thus, an image value of 523135878 may be used as an input to the IBKDF. In some embodiments, the image value may be sent by client computer 102 to server computer 104. In other embodiments, the image value may be calculated by server computer 104 using data sent by client computer 102. For example, if the selected images were identified by client computer 102 in row-column format, then server computer 104 may reference the image grid to determine identifiers for each message.

The salt (S) may be randomly or algorithmically generated data. For example, in some embodiments, a FIPS 149-2 approved Random Bit Generator may be used to generate a salt value. In some embodiments, the salt may be user-specific. For example, the salt may include a user identifier for user 101.

The iteration count (C) may include a number of repetitions of the IBKDF function to be performed to generate the final key. For example, the iteration count may be increased to discourage brute-force or rainbow table-based attacks on the generated IBKDFs. In various embodiments, the iteration count may be adjusted based on the desired tradeoff between speed of derived key computation and security.

The key length (Klen) may be a parameter used to define the length of the generated key. In some embodiments, a higher key length may indicate a more secure key, but may require additional processing to generate.

Once all parameters to the IBKDF are determined, the image-based derived key is generated. Any suitable key generation algorithm may be used by the IBKDF. For example, the PBKDF2 (Password-Based Key Derivation Function 2) standard may be used. The result of the IBKDF is a final key (K) based on the selected subset of authentication images.

IV. Data Encryption Methods

Figure 8:
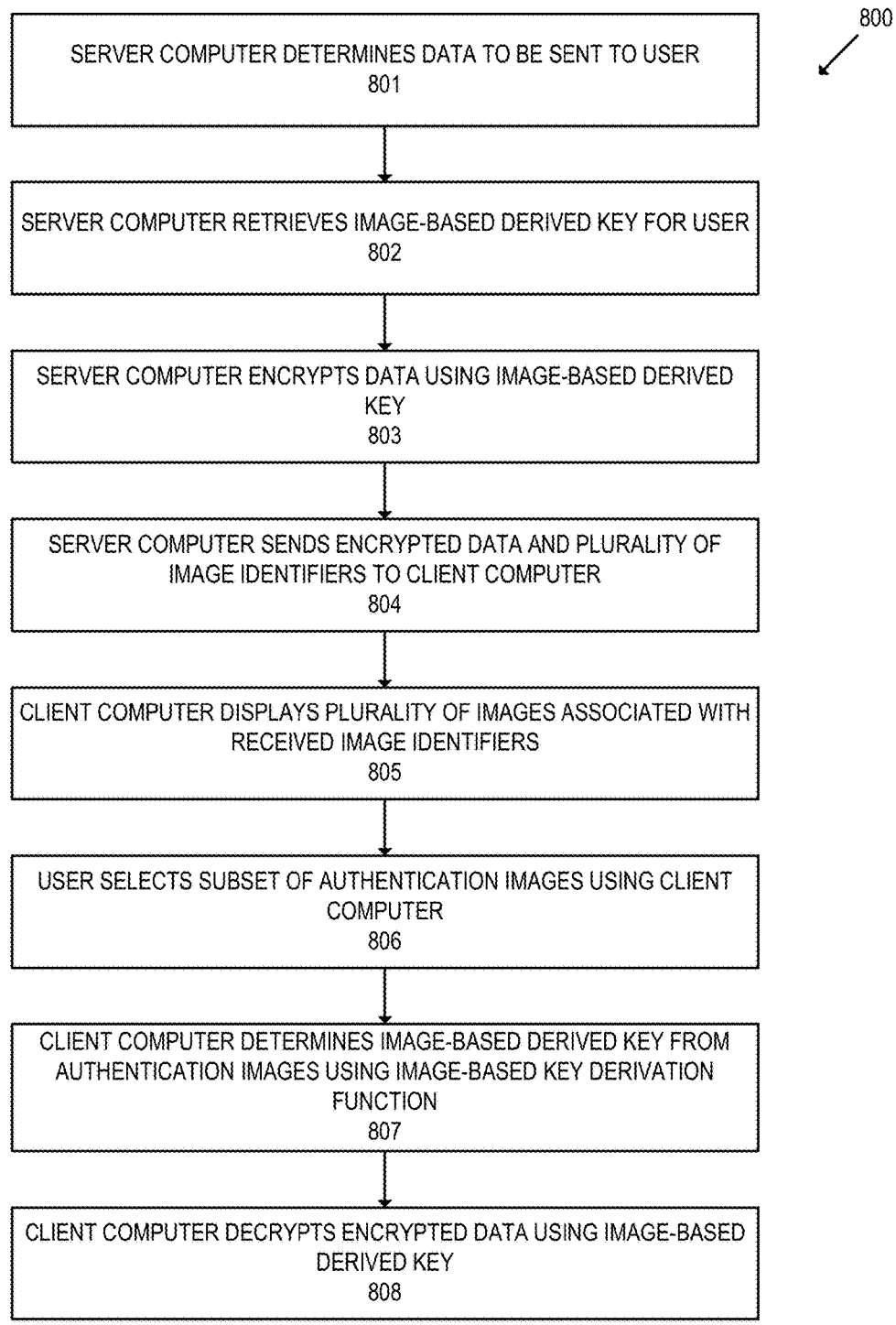
FIG. 8 shows a method of sending encrypted data from a server computer to a client computer using an image-based derived key according to some embodiments.

FIG. 8 shows a method 800 of sending encrypted data from a server computer 104 to a client computer 102 using an image-based derived key. Typically, method 800 may be performed after a user associated with client computer 102 has registered with server computer 104 (e.g., in accordance with methods 400 or 500).

At step 801, server computer 104 determines data to be sent to user 101. In some embodiments, the data may be sensitive in nature, so that it would be undesirable for the data to be sent in plaintext (i.e., unencrypted). For example, the data may include personal information, or payment information. However, any suitable data (e.g., sensitive, non-sensitive, or a combination thereof) may be used with the techniques described herein.

At step 802, server computer 104 retrieves the image-based derived key for user 101. Typically, the image-based derived key is stored in user database 106 or another storage medium. In some embodiments, the image-based derived key may be retrieved using an identifier provided by user 101, such as a username or user ID.

At step 803, server computer 104 encrypts the data determined in step 801 using the retrieved image-based derived key. Server computer 104 may use, for example, encryption module 104(D).

At step 804, server computer 104 sends the encrypted data and a plurality of image identifiers to client computer 102. The plurality of image identifiers may indicate to client computer 102 which authentication images to display to user 101. In some embodiments, the plurality of image identifiers may include identifiers indicating the subset of authentication images chosen by the user, and also a plurality of identifiers indicating other images. Thus, user 101 will be presented with several images, only some of which are part of the subset previously selected by user 101.

At step 805, client computer 102 displays the plurality of images associated with the received image identifiers. For example, grid 600 may again be displayed to the user, or a different grid of images including the soccer player, the basketball player, and the house may be displayed to the user.

At step 806, user 101 selects a subset of authentication images using client computer 102. As described for step 403 of registration method 400, the subset of images selected by user 101 may include a single image, or may include multiple images. In addition, the subset may be unordered or ordered, and may be selected in any suitable manner.

At step 807, client computer 102 determines an image-based derived key from authentication images using an image-based key derivation function. In various embodiments, the image identifiers, hashes of the images, or the images themselves may be used to generate the image-based derived key.

At step 808, client computer 102 decrypts the encrypted data using the image-based derived key.

In one example use case in accordance with method 800, at step 803, server computer 104 encrypts a bank statement for user 101 using the user's image-based derived key. At step 804, the server computer 104 sends the encrypted statement to client computer 102 along with a plurality of image identifiers. At step 805, client computer 102 displays the authentication images corresponding to the received image identifiers. At step 806, the user 101 selects a subset of the authentication images. Then, at steps 807 and 808, client computer 102 derives and decrypts, respectively, the bank statement using the selected subset of authentication images. Thus, server computer 104 securely transmits the user's bank statement to client computer 102.

Figure 9:
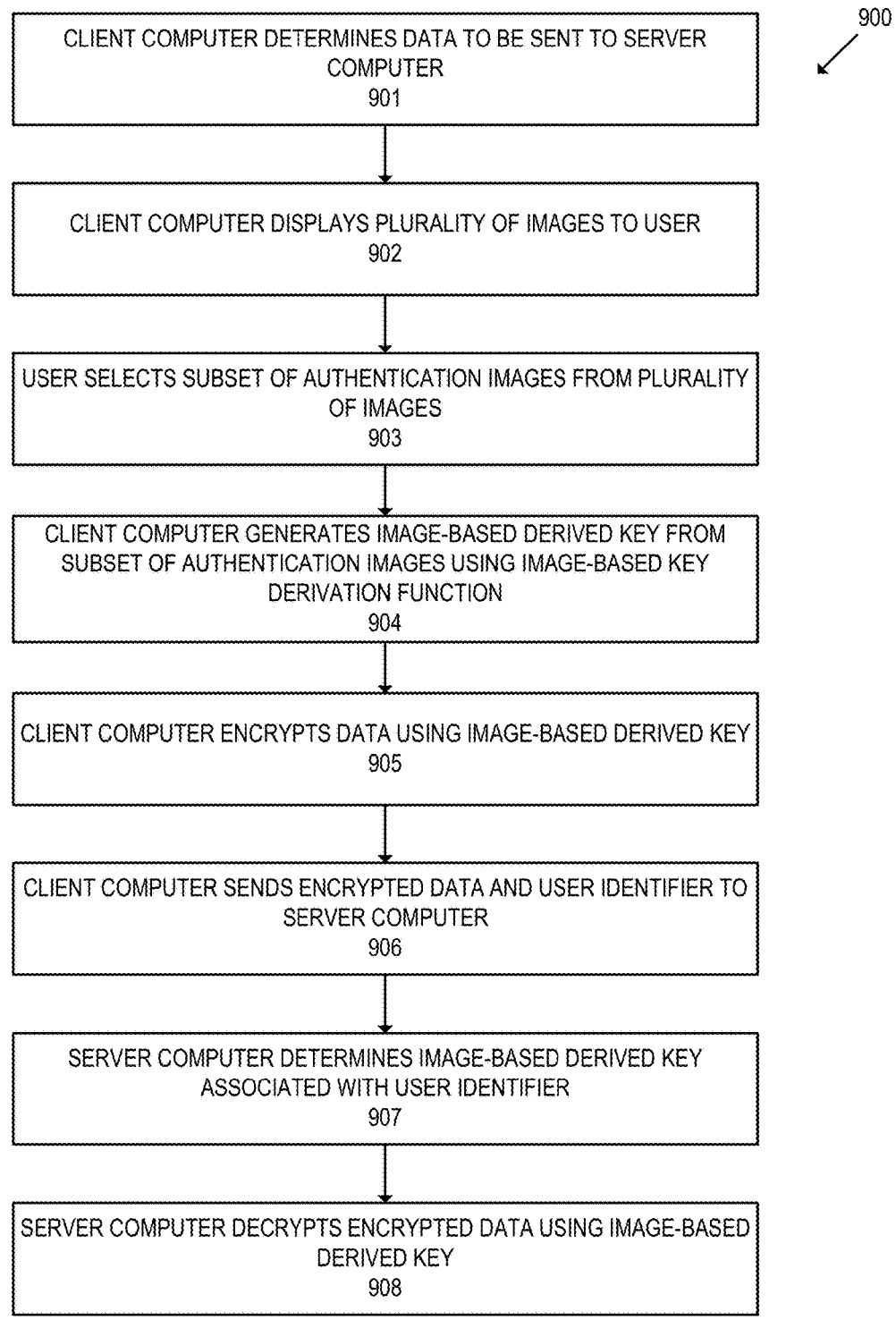
FIG. 9 shows an analogous method of sending encrypted data from a client computer to a server computer according to some embodiments.

FIG. 9 shows an analogous method 900 of sending encrypted data from a client computer 102 to a server computer 104. Typically, method 900 may be performed after a user associated with client computer 102 has registered with server computer 104 (e.g., in accordance with methods 400 or 500).

At step 901, client computer 102 determines data to be sent to server computer 104. Typically, the data may be sensitive in nature, so that it would be undesirable for the data to be sent in plaintext (i.e., unencrypted). For example, the data may include personal information, or payment information. However, any suitable data (e.g., sensitive, non-sensitive, or a combination thereof) may be used with the techniques described herein.

At step 902, client computer 104 displays a plurality of images to the user. The displayed images may be determined using information received from server computer 104 (e.g., image identifiers), or may be determined by client computer 102. For example, grid 600 may again be displayed to the user, or a different grid of images including the soccer player, the basketball player, and the house may be displayed to the user.

At step 903, user 101 selects a subset of authentication images from the plurality of images. The subset of images selected by user 101 may include a single image, or may include multiple images. In addition, the subset may be unordered or ordered, and may be selected in any suitable manner.

At step 904, client computer 102 generates an image-based derived key from the subset of authentication images using an image-based key derivation function.

At step 905, client computer 102 encrypts the data determined in step 901 using the image-based derived key.

At step 906, client computer 102 sends the encrypted data and a user identifier to server computer 104. The user identifier may include any identifier suitable to identify a user. For example, the user identifier may include a username or user ID.

At step 907, server computer 104 determines the image-based derived key associated with the user using the user identifier. For example, in some embodiments, the received user identifier may be used to retrieve the image-based derived key from user database 106.

At step 908, server computer 104 uses the image-based derived key for the user to decrypt the encrypted data.

In one example use case in accordance with method 900, at step 901, user 101 inputs the user's username and credit card number to client computer 102. At step 902, client computer 102 displays a plurality of authentication images to user 101. User 101 selects a subset of the authentication images at step 903, which are used in step 904 to generate an image-based derived key. At step 905, client computer 102 encrypts the user's credit card number and at step 906 sends the encrypted card number to server computer 104 with the user's username. At step 907, server computer 104 retrieves the image-based derived key associated with user 101 using the received username, and at step 908 decrypts the encrypted credit card number using the image-based derived key. Thus, user 101 securely transmits their credit card information to server computer 104.

It should be noted that although methods 800 and 900 describe possible data encryption methods, embodiments of the invention are not limited to the recited methods. For example, although sending image identifiers rather than images as recited in step 804 has the advantage of minimizing data transfer, in some embodiments, the images themselves may be retransmitted. Such embodiments may be especially useful if the client device does not maintain the images locally. Alternatively, in some embodiments, server computer 104 may not send images or image identifiers to client computer 102 at step 804. In some such embodiments, client computer 102 may itself store a plurality of images and determine which images to present to user 101. In such embodiments, the ability to decrypt the unencrypted data may depend both on user 101 knowing the correct selection of authentication images and on client computer 102 having the images.

V. User Authentication Methods

Figure 10:
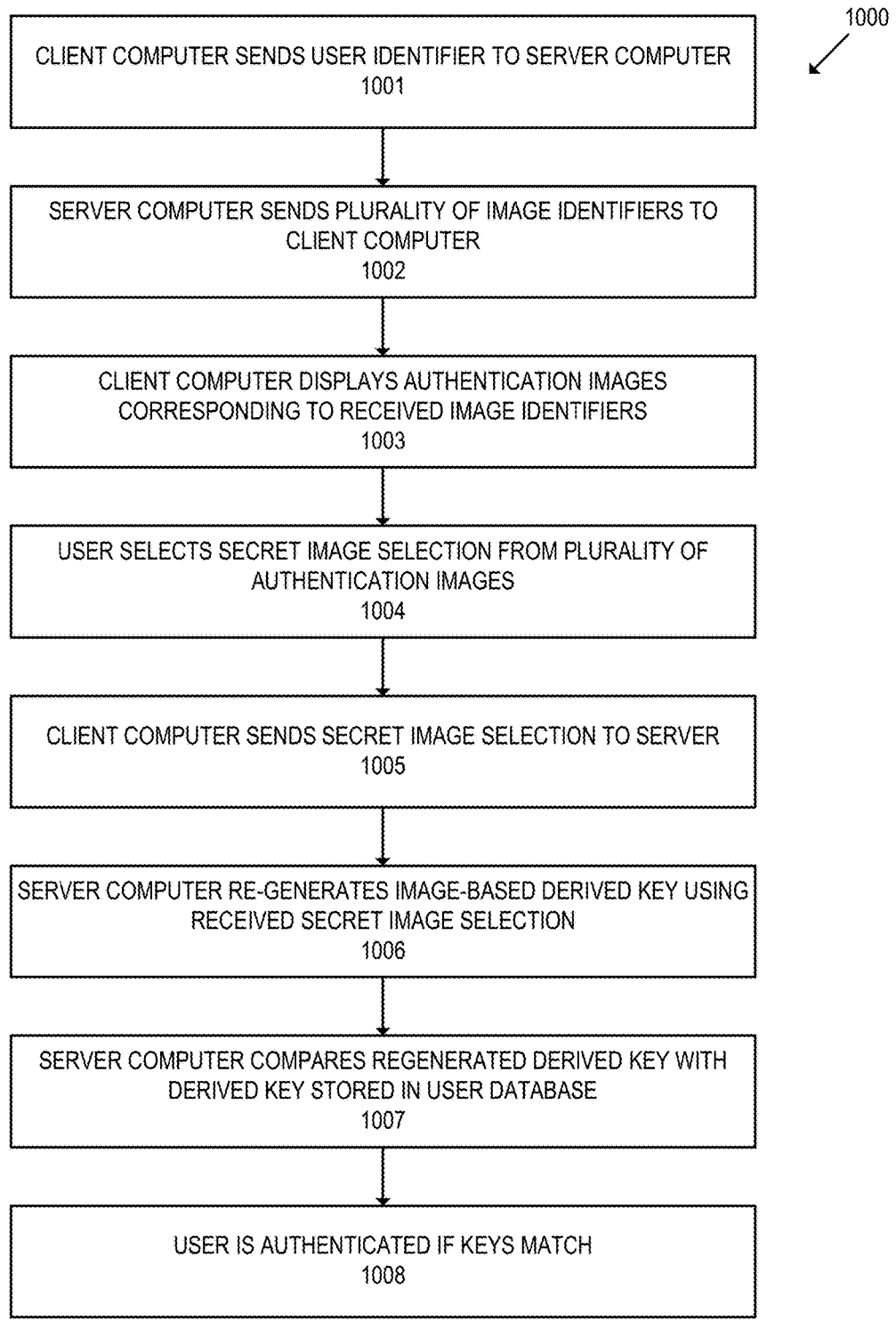
FIG. 10 shows a method for authenticating a user using an image-based derived key according to some embodiments.

FIG. 10 shows a method 1000 for authenticating a user 101 using an image-based derived key. Typically, method 1000 may be performed after a user associated with client computer 102 has registered with server computer 104 (e.g., in accordance with methods 400 or 500).

At step 1001, client computer 102 sends a user identifier to server computer 104. The user identifier may be any data suitable to identify a user 101. For example, the user identifier may comprise a username, an email address, or an account number for user 101.

At step 1002, server computer 104 sends a plurality of image identifiers to client computer 102, wherein the plurality of image identifiers includes the subset of authentication images previously selected by the user 101. Typically, the plurality of sent image identifiers should be high enough that a randomly guessing the secret image selection is unlikely, but not so high as to require user 101 to review an excessive number of images to identify the secret images. For example, if there are three secret images for user 101, a total of 20 image identifiers may be sent in step 1002.

At step 1003, client computer 102 displays authentication images corresponding to the received image identifiers. At step 1004, user 101 selects a subset of the displayed authentication images. At step 1005, client computer 102 sends the secret image selection to the server.

At step 1006, server computer 104 regenerates the image-based derived key using the received subset of authentication images. Typically, the regeneration of the image-based derived key may be performed using a similar method to that described in step 405 of method 400.

At step 1007, server computer 104 compares the regenerated derived key with the derived key stored in the user database 106 for user 101. If the regenerated derived key and the stored derived key match, then at step 1008 the user is authenticated. Otherwise, the user 101 is not authenticated.

In one example, a user 101 previously registered for a website using method 400, selecting as a subset the images of the soccer player, the basketball player, and the house shown in grid 600. At step 1001, the user sends his username to server computer 104. At step 1002, the server computer 104 sends 20 image identifiers to user 101 including identifiers corresponding to the three images in the previously selected subset. At step 1003, client computer 102 displays the images to user 101. At step 1004, user 101 selects a subset of authentication images and at step 1005 client computer 102 sends them to the server computer 104. At steps 1006 and 1007, the server computer 104 regenerates the image-based derived key and compares it to the key previously stored in user database 105. If they match, at step 1008, the user is authenticated.

It should be understood that FIG. 10 is intended to be descriptive and non-limiting. For example, instead of server computer 104 sending a plurality of images to client computer 102 as described in step 1002, user 101 may select images locally stored on client computer 102. In such embodiments, the ability to authenticate the user may depend on both knowing the secret image selection and having, on client computer 102, the secret images. Further, in some embodiments, the user may generate the image-based derived key and send it to server computer 104 for authentication, rather than having server computer 104 regenerate the image-based derived key.

VI. Payment Systems

Figure 11:
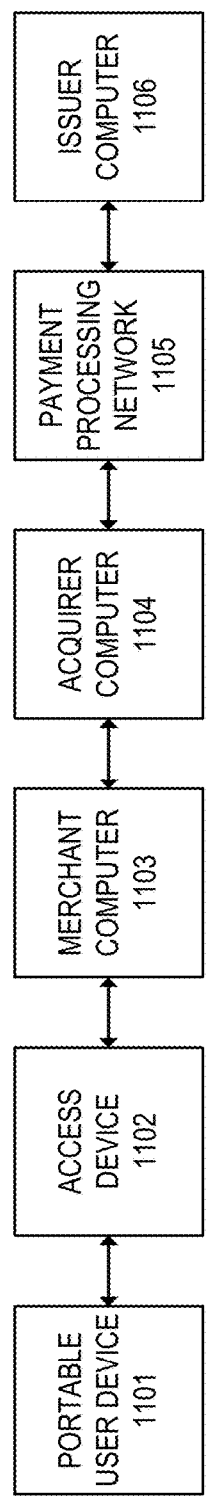
FIG. 11 shows a system used to conduct a payment transaction according to an embodiment of the invention.

FIG. 11 shows a system used to conduct a payment transaction according to an embodiment of the invention. The system comprises a user (not shown) who may operate a portable user 1101. The user may use portable user device 1101 to conduct purchase transactions at an access device 1102 connected to a merchant computer 1103. Merchant computer 1103 may be connected to acquirer computer 1104. Acquirer computer 1104 may be connected to issuer computer 1106 via payment processing network 1105.

As used herein, an "issuer" may typically refer to a business entity (e.g., a bank) that maintains financial accounts for a user and may issues a payment credentials stored on portable consumer device 101, such as a cellular telephone, smart card, tablet, or laptop, to the user. A "merchant" is typically an entity that engages in transactions and can sell goods or services. An "acquirer" is typically a business entity (e.g., a commercial bank) that has a business relationship with a particular merchant or other entity. Some entities can perform both issuer and acquirer functions. Some embodiments may encompass such single entity issuer-acquirers. Each of the entities (e.g., merchant computer 1103, acquirer computer 1104, payment processing network 1105, and issuer computer 1106) may comprise one or more computer apparatuses to enable communications or to perform one or more of the functions described herein.

The payment processing network 1105 may include data processing subsystems, networks, and operations used to support and deliver certificate authority services, authorization services, exception file services, and clearing and settlement services. An exemplary payment processing network may include VisaNet™. Payment processing networks such as VisaNet™ are able to process credit card transactions, debit card transactions, digital wallet transactions, and other types of commercial transactions. VisaNet™, in particular, includes a VIP system (Visa Integrated Payments system) which processes authorization requests and a Base II system which performs clearing and settlement services. In some embodiments, payment processing network 1105 may conduct transactions in substantially real-time.

The payment processing network 1105 may include one or more server computers. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 1105 may use any suitable wired or wireless network, including the Internet.

In a typical purchase transaction, the user purchases a good or service at merchant 1103 using a portable consumer device 1101 (e.g., a mobile phone). The user's portable consumer device 1101 can interact with an access device 1102 at a merchant associated with merchant computer 1103. For example, the user may tap the portable consumer device 1101 against an NFC reader in the access device 1102. Alternatively, the user may indicate payment details to the merchant electronically, such using a digital wallet or in an online transaction.

An authorization request message is generated by the access device 1102 and is then forwarded to the acquirer computer 1104. Typically, the authorization request message will include a field for a primary account number (PAN) associated with the portable consumer device 1101. After receiving the authorization request message, the authorization request message is then sent to the payment processing network 1105. The payment processing network 1105 then forwards the authorization request message to the corresponding issuer computer 1106 associated with the issuer of the user's account. The PAN included in the authorization request message may be used to route the message to the appropriate issuer computer 1106.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a user using a payment device (e.g., a mobile device) or payment account. The authorization request message may include an issuer account identifier that may be associated with a payment device or payment account. An authorization request message may also comprise additional data elements corresponding to "identification information" including, by way of example only: a service code, a CW (card verification value), a dCW (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

After the issuer computer 1106 receives the authorization request message, the issuer computer 1106 sends an authorization response message back to the payment processing network 1105 to indicate whether or not the current transaction is authorized (or not authorized). The payment processing network 1105 then forwards the authorization response message back to the acquirer 1104. The acquirer 1104 then sends the response message back to the merchant computer 1103. In some embodiments, such as when a fraud rule is triggered at payment processing network 1105, payment processing network 1105 may decline a transaction previously authorized by issuer computer 1106.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

After the merchant computer 1103 receives the authorization response message, the access device at the merchant computer 1103 may then provide the authorization response message for the user. The response message may be displayed by the contactless access device, or may be printed out on a receipt. Alternately, if the transaction is an online transaction, the merchant may provide a web page or other indication of the authorization response message.

At the end of the day, a normal clearing and settlement process can be conducted by the payment processing network 1105. A clearing process is a process of exchanging financial details between and acquirer and an issuer to facilitate posting to a user's payment account and reconciliation of the user's settlement position. However, it should be noted that embodiments of the invention are not limited to a single settlement process.

Embodiments of the invention may be used in accordance with the system of FIG. 11 in any suitable manner. For example, in some embodiments, a user 101 may connect using client computer 102 to merchant computer 1103. For example, merchant computer 1103 may operate an e-commerce website. In order to create an account with merchant computer 1103, user 101 may first register with the merchant computer 1103 using client computer 102 in accordance with method 400 or method 500. When the user later logs onto merchant computer 1103, authentication method 1000 may be performed. When user 101 conducts a payment transaction for goods or services at the merchant, secure communication methods 800 and/or 900 may be performed. For example, user 101 may send payment information to merchant computer 1103 in accordance with method 900. Similarly, the merchant may send an invoice or receipt to user 101 in accordance with method 800. In the methods, merchant computer 1103 may perform the role of server computer 104, and the user's computer may perform the role of client computer 102. More generally, the methods described above may be used for communication and authentication between any entities in the system of FIG. 11.

VII. Computer Apparatuses

Figure 12:
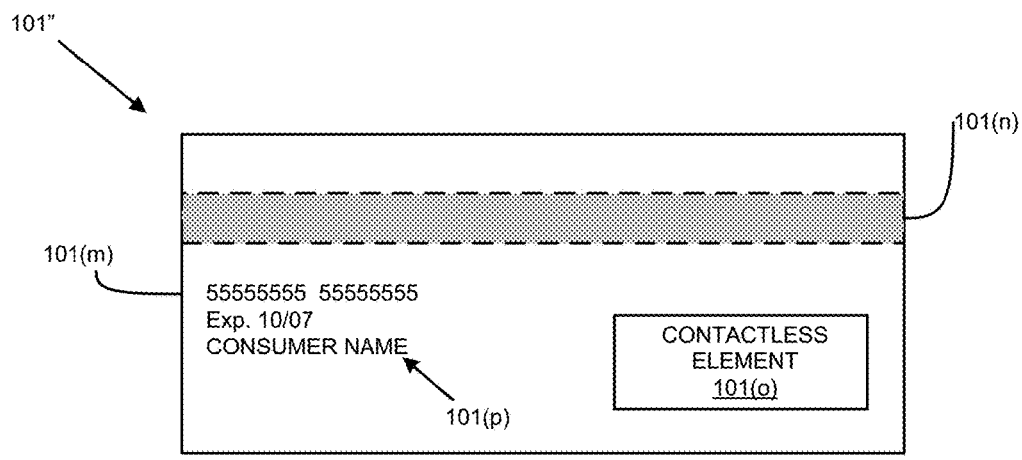
FIG. 12 shows an example of a payment device in the form of a card according to some embodiments.

FIG. 12 shows an example of a payment device 101'' in the form of a card. As shown, the payment device 101'' comprises a plastic substrate 101(*m*). In some embodiments, a contactless element 101(*o*) for interfacing with an access device 102 may be present on, or embedded within, the plastic substrate 101(*m*). User information 101(*p*) such as an account number, expiration date, and/or a user name may be printed or embossed on the card. A magnetic stripe 101(*n*) may also be on the plastic substrate 101(*m*). In some embodiments, the payment device 101'' may comprise a microprocessor and/or memory chips with user data stored in them.

As noted above and shown in FIG. 12, the payment device 101'' may include both a magnetic stripe 101(*n*) and a contactless element 101(*o*). In some embodiments, both the magnetic stripe 101(*n*) and the contactless element 101(*o*) may be in the payment device 101''. In some embodiments, either the magnetic stripe 101(*n*) or the contactless element 101(*o*) may be present in the payment device 101''.

Figure 13:
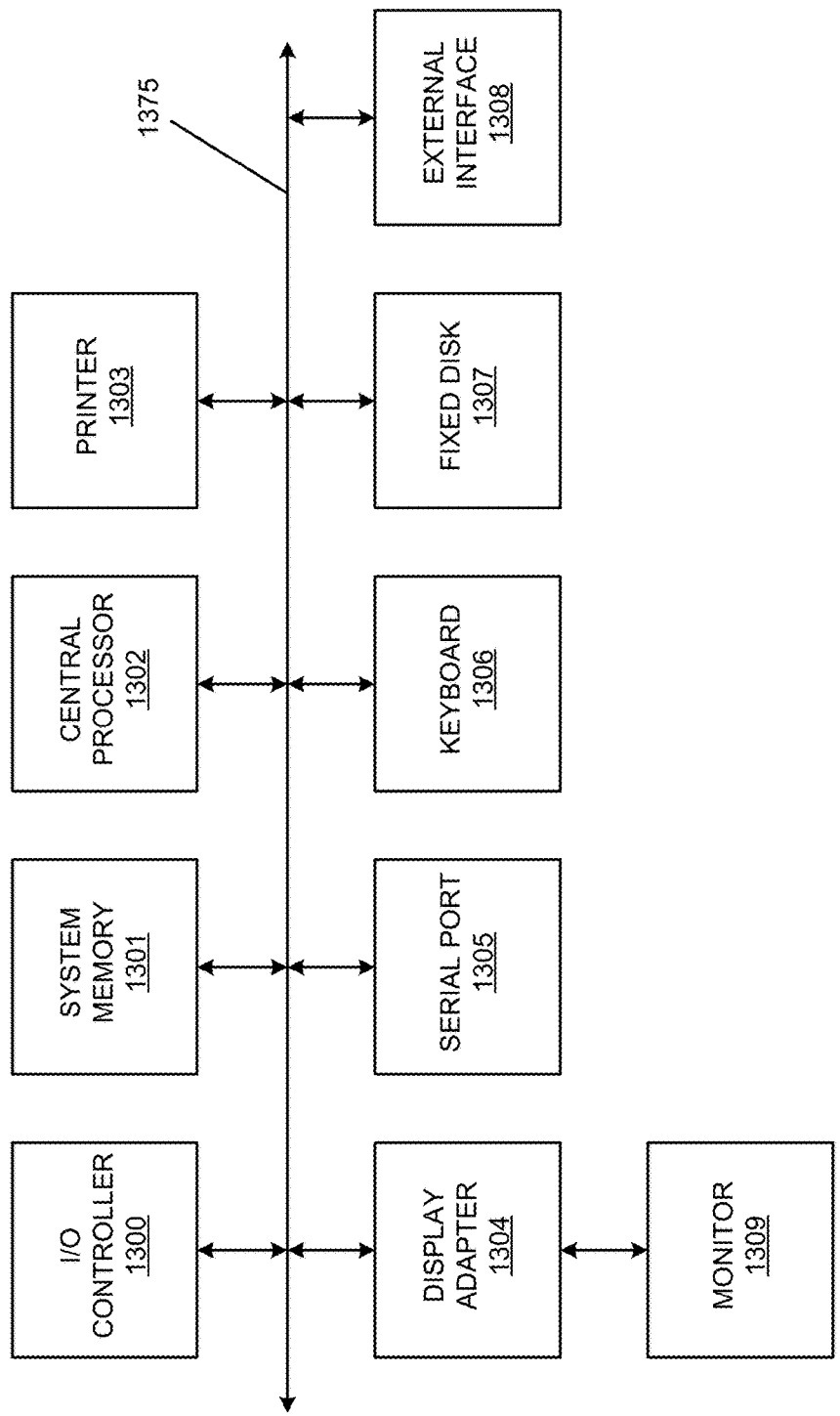
FIG. 13 shows a block diagram of a computer apparatus according to some embodiments.

FIG. 13 is a high level block diagram of a computer system that may be used to implement any of the entities or components described above. The subsystems shown in FIG. 13 are interconnected via a system bus 1375. Additional subsystems include a printer 1303, keyboard 1306, fixed disk 1307, and monitor 1309, which is coupled to display adapter 1304. Peripherals and input/output (I/O) devices, which couple to I/O controller 1300, can be connected to the computer system by any number of means known in the art, such as a serial port. For example, serial port 1305 or external interface 1308 can be used to connect the computer apparatus to a wide area network such as the Internet, a mouse input device, or a scanner. The interconnection via system bus 1375 allows the central processor 1302 to communicate with each subsystem and to control the execution of instructions from system memory 1301 or the fixed disk 1307, as well as the exchange of information between subsystems. The system memory 1301 and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A computing device comprising:
    a processor; and
    a non-transitory computer-readable medium comprising code executable by the processor for implementing operations including:
        receiving, from another computing device, an identifier and first encrypted data that was encrypted using an image-based derived key, the identifier being stored with the image-based derived key in an entry of a database;
        determining the image-based derived key associated with the identifier,
        wherein the image-based derived key is generated from a selection of authentication images, and a combination of image identifiers and pixel properties of the authentication images is used as an image input value to an image-based derived key function, and
        wherein the image-based derived key is further generated based on:
            an adjustable iteration count value being an input to the image-based derived key function indicating a number of repetitions that the image-based derived key function is performed to generate the image-based derived key;
            an adjustable key length indicating a length of the image-based derived key; and
            a salt value based on the identifier that is stored with the image-base derived key in the entry of the database; and
        decrypting the first encrypted data.

2. The computing device of claim 1, wherein the authentication images are displayed on a user interface as a subset of a plurality of displayed images.

3. The computing device of claim 2, wherein the operations further include receiving the image identifiers of the authentication images.

4. The computing device of claim 2, wherein the plurality of displayed images are randomly arranged in a grid displayed on the user interface.

5. The computing device of claim 1, wherein the operations further include receiving the selection of the authentication images.

6. The computing device of claim 1, wherein the operations further include sending second encrypted data that was encrypted using the image-based derived key.

7. The computing device of claim 1, wherein the operations further include comparing the determined image-based derived key with the image-based derived key stored in the database.

8. The computing device of claim 7, wherein the operations further include authenticating a user when the determined image-based derived key matches the image-based derived key stored in the database.

9. The computing device of claim 7, wherein the image-based derived key being compared was stored in the database during a registration process.

10. The computing device of claim 1, wherein the image-based derived key is used in a payment system.

11. A computer-implemented method comprising:
    receiving, from a computing device, an identifier and first encrypted data that was encrypted using an image-based derived key, the identifier being stored with the image-based derived key in an entry of a database;
    determining the image-based derived key associated with the identifier,
    wherein the image-based derived key is generated from a selection of authentication images, and a combination of image identifiers and pixel properties of the authentication images is used as an image input value to an image-based derived key function, and
    wherein the image-based derived key is further generated based on:
        an adjustable iteration count value being an input to the image-based derived key function indicating a number of repetitions that the image-based derived key function is performed to generate the image-based derived key;
        an adjustable key length indicating a length of the image-based derived key; and
        a salt value based on the identifier that is stored with the image-based derived key in the entry of the database and
    decrypting the first encrypted data.

12. The computer-implemented method of claim 11, wherein the authentication images are displayed on a user interface as a subset of a plurality of displayed images.

13. The computer-implemented method of claim 12, further comprising receiving the image identifiers of the authentication images.

14. The computer-implemented method of claim 12, wherein the plurality of displayed images are randomly arranged in a grid displayed on the user interface.

15. The computer-implemented method of claim 11, further comprising receiving the selection of the authentication images.

16. The computer-implemented method of claim 11, further comprising sending second encrypted data that was encrypted using the image-based derived key to the computing device.

17. The computer-implemented method of claim 11, further comprising comparing the determined image-based derived key with the image-based derived key stored in the database.

18. The computer-implemented method of claim 17, further comprising authenticating a user when the determined image-based derived key matches the image-based derived key stored in the database.

19. The computer-implemented method of claim 17, wherein the image-based derived key being compared was stored in the database during a registration process.

20. The computer-implemented method of claim 11, wherein the image-based derived key is used in a payment system.

\* \* \* \* \*